(12) United States Patent
Seo et al.

(10) Patent No.: US 12,527,355 B2
(45) Date of Patent: Jan. 20, 2026

(54) AEROSOL GENERATING SYSTEM AND OPERATING METHOD THEREFOR

(71) Applicant: KT&G CORPORATION, Daejeon (KR)

(72) Inventors: Jang Won Seo, Daejeon (KR); Gyoung Min Go, Daejeon (KR); Hyung Jin Bae, Daejeon (KR); Chul Ho Jang, Daejeon (KR); Min Seok Jeong, Seoul (KR); Jong Seong Jeong, Sejong (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 1016 days.

(21) Appl. No.: 17/634,446

(22) PCT Filed: Jul. 16, 2021

(86) PCT No.: PCT/KR2021/009205
§ 371 (c)(1),
(2) Date: Feb. 10, 2022

(87) PCT Pub. No.: WO2022/015111
PCT Pub. Date: Jan. 20, 2022

(65) Prior Publication Data
US 2022/0312850 A1    Oct. 6, 2022

(30) Foreign Application Priority Data

Jul. 16, 2020   (KR) .................. 10-2020-0088466

(51) Int. Cl.
*A24F 40/465*    (2020.01)
*A24F 40/50*    (2020.01)
(Continued)

(52) U.S. Cl.
CPC ............ *A24F 40/465* (2020.01); *A24F 40/50* (2020.01); *A24F 40/53* (2020.01); *A24F 40/57* (2020.01)

(58) Field of Classification Search
CPC ........ A24F 40/465; A24F 40/50; A24F 40/53; H05B 6/06; H05B 6/105
See application file for complete search history.

(56) References Cited

U.S. PATENT DOCUMENTS 9,173,251 B2   10/2015   Uchida et al.
9,480,107 B2 *   10/2016   Oh .................. H05B 6/065
(Continued)

FOREIGN PATENT DOCUMENTS

CN    201263225 Y    6/2009
CN    109843097 A    6/2019
(Continued)

OTHER PUBLICATIONS

Communication dated Apr. 1, 2022 from the Korean Patent Office in Korean Application No. 10-2020-0088466.
(Continued)

*Primary Examiner* — Marcus E Harcum
(74) *Attorney, Agent, or Firm* — Sughrue Mion, PLLC

(57) ABSTRACT

An aerosol generating system may include a plurality of susceptors having different resonance frequencies and configured to heat different portions of a cigarette accommodated in an aerosol generating device, a coil configured to heat the plurality of susceptors, a plurality of capacitors connected to the coil, and a processor configured to determine a combination of capacitors through which current applied to the coil is to pass from among the plurality of capacitors, and heat a susceptor corresponding to a resonance frequency according to the combination by applying current to the coil according to the combination.

13 Claims, 7 Drawing Sheets

(51) Int. Cl.
*A24F 40/53* (2020.01)
*A24F 40/57* (2020.01)

(56) References Cited

U.S. PATENT DOCUMENTS

| | | | |
|---|---|---|---|
| 10,869,504 B2 | 12/2020 | Mironov et al. | |
| 11,470,883 B2 | 10/2022 | Kaufman et al. | |
| 11,546,975 B2* | 1/2023 | Rogan | H05B 6/105 |
| 12,016,394 B2* | 6/2024 | Courbat | A24F 40/50 |
| 12,144,367 B2* | 11/2024 | Gill | A24C 5/01 |
| 2018/0310622 A1 | 11/2018 | Mironov et al. | |
| 2019/0313695 A1 | 10/2019 | Kaufman et al. | |
| 2020/0275705 A1 | 9/2020 | Rogan et al. | |
| 2020/0359688 A1 | 11/2020 | Jang et al. | |
| 2020/0375255 A1 | 12/2020 | Courbat et al. | |
| 2022/0030947 A1* | 2/2022 | Zinovik | H05B 6/108 |
| 2022/0202091 A1* | 6/2022 | Chong | A24F 40/70 |
| 2022/0218029 A1 | 7/2022 | Mironov et al. | |
| 2024/0315342 A1 | 9/2024 | Kaufman et al. | |

FOREIGN PATENT DOCUMENTS

| | | |
|---|---|---|
| CN | 110913713 A | 3/2020 |
| EP | 3 664 640 A1 | 6/2020 |
| JP | 63-218187 A | 9/1988 |
| JP | 2004-169133 A | 6/2004 |
| JP | 2019-531740 A | 11/2019 |
| KR | 10-2013-0033421 A | 4/2013 |
| KR | 10-2018-0040690 A | 4/2018 |
| KR | 10-2018-0069895 A | 6/2018 |
| KR | 10-2019-0047092 A | 5/2019 |
| KR | 10-2020-0038956 A | 4/2020 |
| KR | 10-2020-0054156 A | 5/2020 |
| KR | 10-2020-0056994 A | 5/2020 |
| WO | 2018/073376 A1 | 4/2018 |
| WO | 2019/030353 A1 | 2/2019 |
| WO | 2019/057942 A1 | 3/2019 |
| WO | 2019/122097 A1 | 6/2019 |

OTHER PUBLICATIONS

International Search Report for PCT/KR2021/009205 dated Oct. 22, 2021 [PCT/ISA/210].
Written Opinion for PCT/KR2021/009205 dated Oct. 22, 2021 [PCT/ISA/237].
Office Action issued Mar. 14, 2023 in Japanese Application No. 2022-505630.
Extended European Search Report dated Oct. 26, 2022, issued in European Application No. 21841229.4.
Communication issued Dec. 9, 2024 in Chinese Application No. 202180006356.4.

* cited by examiner

AEROSOL GENERATING SYSTEM AND OPERATING METHOD THEREFOR

TECHNICAL FIELD

The present disclosure relates to an aerosol generating system and a method for operating the same.

BACKGROUND ART

Recently, there has been an increasing demand for alternative methods of overcoming the disadvantages of general aerosol generating articles. For example, there is an increasing demand for a method of generating an aerosol by heating an aerosol generating material in cigarettes, rather than by burning cigarettes.

Examples of methods of heating aerosol generating materials include an internal heating method, an external heating method, and an induction heating method using a coil and a susceptor. Also, although it is common that an aerosol generating device generates an aerosol by heating an area of a cigarette, there is a demand for technology of heating a plurality of areas of a cigarette at different times or at different temperatures to improve user satisfaction.

DESCRIPTION OF EMBODIMENTS

Technical Problem

There are provided an aerosol generating system and a method for operating the same. In detail, there is provided a system for determining a combination of capacitors through which current applied to a coil is to pass and heating a susceptor corresponding to the combination from among a plurality of susceptors. The technical problems of the present disclosure are not limited to the technical problems mentioned above, and other technical problems not mentioned will be clearly understood by one of ordinary skill in the art from the description below.

Solution to Problem

An aerosol generating system according to an aspect includes: a plurality of susceptors having different resonance frequencies and configured to heat different portions of a cigarette accommodated in an aerosol generating device; a coil configured to heat the plurality of susceptors; a plurality of capacitors connected to the coil; and a processor configured to determine a combination of capacitors through which current applied to the coil is to pass from among the plurality of capacitors, and heat a susceptor corresponding to a resonance frequency according to the combination by applying current to the coil according to the combination.

Advantageous Effects of Disclosure

An aerosol generating system may provide a consistent feeling of smoking and satisfaction to a user by determining a susceptor to be heated from among a plurality of susceptors and changing the susceptor to be heated during a smoking operation. Effects of the present disclosure are not limited to the above-mentioned effects, and other effects not mentioned will be clearly understood by one of ordinary skill in the art to which the present disclosure pertains from the specification and the attached drawings.

BEST MODE

Figure 1:
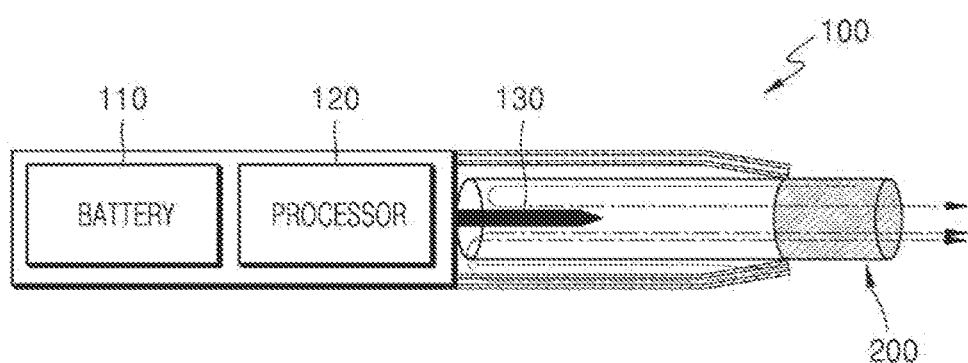
FIG. 1 is a view illustrating an example where a cigarette is inserted into an internal heating aerosol generating device.

An aerosol generating system according to an aspect includes: a plurality of susceptors having different resonance frequencies and configured to heat different portions of a cigarette accommodated in an aerosol generating device; a coil configured to heat the plurality of susceptors; a plurality of capacitors connected to the coil; and a processor configured to determine a combination of capacitors through which current applied to the coil is to pass from among the plurality of capacitors, and heat a susceptor corresponding to a resonance frequency according to the combination by applying current to the coil according to the combination.

Also, the processor may be further configured to apply current having the resonance frequency according to the combination to the coil.

Also, the processor may be further configured to, within one smoking operation, heat the susceptor corresponding to the resonance frequency according to the combination during a pre-set time, and then change the combination and heat a susceptor corresponding to a resonance frequency according to the changed combination during a remaining time.

Also, the processor may be further configured to heat at least one susceptor not corresponding to the resonance frequency according to the combination to a temperature lower than a temperature of the susceptor corresponding to the resonance frequency according to the combination.

Also, the plurality of susceptors may be arranged in the aerosol generating device or the cigarette in a longitudinal direction of the cigarette accommodated in the aerosol generating device, and the coil may surround the plurality of susceptors.

Also, the plurality of capacitors may be connected in parallel to one another, and are connected in series to the coil.

Also, the aerosol generating system may further include switches respectively connected in series to the plurality of susceptors, wherein the processor is further configured to turn on/off the switches according to the combination.

Also, the aerosol generating system may further include a cigarette, wherein the cigarette may include different materials in the different portions, wherein, when the susceptor corresponding to the combination is heated, aerosols of different components are generated from the aerosol generating system.

Also, the aerosol generating system may further include a cigarette, wherein the cigarette may include different amounts of moisturizer in the different portions, wherein, when the susceptor corresponding to the combination is heated, different amounts of aerosol are generated from the aerosol generating system.

A method for operating an aerosol generating system according to another aspect includes: determining a combination of capacitors through which current applied to a coil is to pass from among a plurality of capacitors connected to the coil; applying current to the coil according to the combination; and heating a susceptor corresponding to a resonance frequency according to the combination from among a plurality of susceptors having different resonance frequencies by applying current to the coil.

Also, the applying may include applying current having the resonance frequency according to the combination to the coil.

Also, the heating may include heating the susceptor during a pre-set time, within a time corresponding to one smoking operation, wherein the method further includes: changing the combination; and, within the time corresponding to one smoking operation, heating a susceptor corresponding to a resonance frequency according to the changed combination during a remaining time.

Also, the heating may include heating at least one susceptor not corresponding to the resonance frequency according to the combination to a temperature lower than a temperature of the susceptor corresponding to the resonance frequency according to the combination.

Mode of Disclosure

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

With respect to the terms used to describe the various embodiments, general terms which are currently and widely used are selected in consideration of functions of structural elements in the various embodiments of the present disclosure. However, meanings of the terms may be changed according to intention, a judicial precedence, the appearance of new technology, and the like. Also, some of the terms used herein may be arbitrarily chosen by the present applicant, and in this case, these terms are defined in detail below. Accordingly, the specific terms used herein should be defined based on the unique meanings thereof and the whole context of the present invention.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and may be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily carry out the present disclosure. The disclosure may, however, be embodied in many different forms and should not be construed as being limited to the embodiments set forth herein.

It will be understood that, although the terms 'first', 'second', etc. may be used herein to describe various elements, these elements should not be limited by these terms. These terms are only used to distinguish one component from another.

Embodiments of the present disclosure will be described in detail with reference to the drawings.

FIG. 1 is a view illustrating an example where a cigarette is inserted into an internal heating aerosol generating device.

Referring to FIG. 1, an aerosol generating device 100 includes a battery 110, a processor 120, and a heater 130. Also, a cigarette 200 may be inserted into an inner space of the aerosol generating device 100.

FIG. 1 illustrates elements of the aerosol generating device 100, which are related to the present embodiment. Accordingly, it will be understood by one of ordinary skill in the art related to the present embodiment that general-purpose elements other than the elements of FIG. 1 may be further included in the aerosol generating device 100.

In FIG. 1, the battery 110, the processor 120, and the heater 130 are aligned with one another. However, an internal structure of the aerosol generating device 100 is not limited to that of FIG. 1. In other words, according to a design of the aerosol generating device 100, an arrangement of the battery 110, the processor 120, and the heater 130 may be changed.

When a cigarette 200 is inserted into the aerosol generating device 100, the aerosol generating device 100 may operate the heater 130 to generate an aerosol. The aerosol generated by the heater 130 passes through the cigarette 200 and is delivered to a user.

When necessary, even when the cigarette 200 is not inserted into the aerosol generating device 100, the aerosol generating device 100 may heat the heater 130.

The battery 110 supplies power used to operate the aerosol generating device 100. For example, the battery 110 may supply power to heat the heater 130, and may supply power required to operate the processor 120. Also, the battery 110 may supply power required to operate a display, a sensor, a motor, etc. provided in the aerosol generating device 100.

The processor 120 controls overall operations of the aerosol generating device 100. In detail, the processor 120 controls not only operations of the battery 110 and the heater 130 but also operations of other elements included in the aerosol generating device 100. Also, the processor 120 may determine whether the aerosol generating device 100 is able to operate, by identifying a state of each of elements of the aerosol generating device 100.

The processor 120 may include an array of logic gates, or may include a combination of a general-purpose microprocessor and a memory in which a program executable by the microprocessor is stored. Also, it will be understood by one of ordinary skill in the art related to the present embodiment that the processor 120 may include another type of hardware.

The heater 130 may be heated by power supplied from the battery 110. For example, when the cigarette is inserted into the aerosol generating device 100, the heater 130 may be located outside the cigarette. Accordingly, the heated heater 130 may increase a temperature of an aerosol generating material in the cigarette.

The heater 130 may be an electro-resistive heater. For example, the heater 130 may include an electrically conductive track, and the heater 130 may be heated when current flows through the electrically conductive track. However, the heater 130 is not limited to the above example, and may include any heater that may be heated to a desired temperature. The desired temperature may be pre-set in the aerosol generating device 100, or may be set as a temperature desired by the user.

For example, the heater 130 may have an elongated shape (e.g., a rod shape, a needle shape, or a blade shape) or a cylindrical shape, and may heat the inside or the outside of the cigarette 200 according to a shape of a heating element.

Also, a plurality of heaters 130 may be located in the aerosol generating device 100. In this case, the plurality of heaters 130 may be inserted into the cigarette 200, or may be located outside the cigarette 200. Also, some of the plurality of heaters 130 may be inserted into the cigarette 200, and the others may be located outside the cigarette 200. Also, a shape of the heater 130 is not limited to that illustrated in FIG. 1, and may include various shapes.

The aerosol generating device 100 may further include general-purpose elements in addition to the battery 110, the processor 120, and the heater 130. For example, the aerosol generating device 100 may include a display capable of outputting visual information and/or a motor for outputting haptic information. Also, the aerosol generating device 100 may include at least one sensor (e.g., a puff detecting sensor, a temperature detecting sensor, and a cigarette insertion detecting sensor). Also, the aerosol generating device 100 may be manufactured so that external air may be introduced or internal gas may be discharged even in a state where the cigarette 200 is inserted.

Although not shown in FIG. 1, the aerosol generating device 100 may constitute a system along with a separate cradle. For example, the cradle may be used to charge the battery 110 of the aerosol generating device 100. Alternatively, the heater 130 may be heated in a state where the cradle and the aerosol generating device 100 are coupled to each other.

The cigarette 200 may be divided into a medium portion including an aerosol generating material and a filter portion including a filter or the like. Alternatively, an aerosol generating material may also be included in the filter portion of the cigarette 200. For example, a capsuled aerosol generating material made in the form of granules or capsules may be inserted into the filter portion.

The entire medium portion may be inserted into the aerosol generating device 100, and the filter portion may be exposed to the outside. Alternatively, only a part of the medium portion may be inserted into the aerosol generating device 100, or the entire medium portion and a part of the filter portion may be inserted into the aerosol generating device 100. The user may puff an aerosol while holding the filter portion by the mouth of the user. In this case, an aerosol may be generated when external air passes through the medium portion, and the generated aerosol passes through the filter portion and is delivered to the user's mouth.

For example, external air may be introduced through at least one air passage formed in the aerosol generating device 100. For example, the opening/closing and/or a size of the air passage formed in the aerosol generating device 100 may be adjusted by the user. Accordingly, the amount of smoke and a smoking impression may be adjusted by the user. In another embodiment, external air may be introduced into the cigarette 200 through at least one hole formed in a surface of the cigarette 200.

Figure 2:
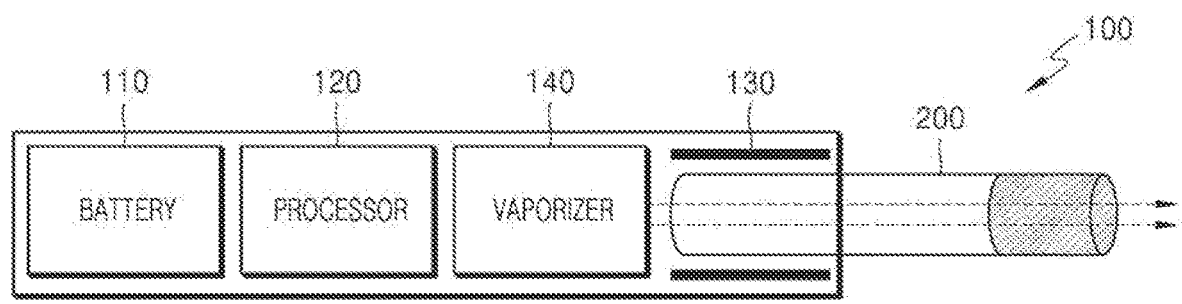
FIG. 2 is a view illustrating examples where a cigarette is inserted into an external heating aerosol generating device.

FIG. 2 is a view illustrating examples where a cigarette is inserted into an external heating aerosol generating device.

Referring to FIG. 2, the aerosol generating device 100 further includes a vaporizer 140 in addition to the elements illustrated in FIG. 1. The cigarette 200, the battery 110, the processor 120, and the heater 130 of FIG. 2 may respectively correspond to the cigarette 200, the battery 110, the processor 120, and the heater 130 of FIG. 1. Accordingly, a repeated description will be omitted.

FIG. 2 illustrates elements of the aerosol generating device 100, which are related to the present embodiment. Accordingly, it will be understood by one of ordinary skill in the art related to the present embodiment that general-purpose elements other than the elements illustrated in FIG. 2 may be further included in the aerosol generating device 100.

Also, although the heater 130 is included in the aerosol generating device 100 in FIG. 2, the heater 130 may be omitted when necessary.

In FIG. 2, the battery 110, the processor 120, the vaporizer 140, and the heater 130 are aligned with one another.

When the cigarette 200 is inserted into the aerosol generating device 100, the aerosol generating device 100 may operate the heater 130 and/or the vaporizer 140, to generate an aerosol. The aerosol generated by the heater 130 and/or the vaporizer 140 passes through the cigarette 200 and is delivered to a user.

The battery 110 may supply power to heat the vaporizer 140. The processor 120 controls an operation of the vaporizer 140.

The vaporizer 140 may generate an aerosol by heating a liquid composition, and the generated aerosol may pass through the cigarette 200 to be delivered to the user. In other words, the aerosol generated via the vaporizer 140 may move along an air flow passage of the aerosol generating device 100, and the air flow passage may be configured such that the aerosol generated via the vaporizer 140 passes through the cigarette 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to the user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, an aerosol may be generated.

For example, the vaporizer 140 may be referred to as a cartomizer or an atomizer, but it is not limited thereto.

Figure 3:
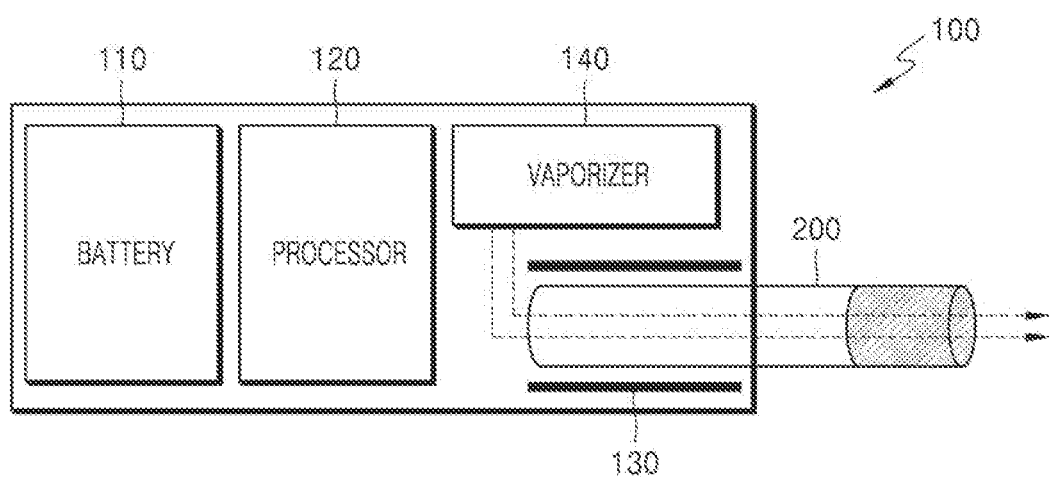
FIG. 3 is a view illustrating another example where a cigarette is inserted into an external heating aerosol generating device.

FIG. 3 is a view illustrating another example where a cigarette is inserted into an external heating aerosol generating device.

The cigarette 200, the battery 110, the processor 120, the heater 130, and the vaporizer 140 of FIG. 3 may respectively correspond to the cigarette 200, the battery 110, the processor 120, the heater 130, and the vaporizer 140 of FIG. 2. Accordingly, a repeated description will be omitted.

In FIG. 3, the vaporizer 140 and the heater 130 are arranged in parallel. In other words, the vaporizer 140 and the heater 130 may be aligned with each other as shown in FIG. 2, or may be arranged in parallel as shown in FIG. 3. However, an internal structure of the aerosol generating device 100 is not limited those illustrated in FIGS. 2 and 3. In other words, an arrangement of the battery 110, the processor 120, the heater 130, and the vaporizer 140 may be changed, according to a design of the aerosol generating device 100.

Figure 4:
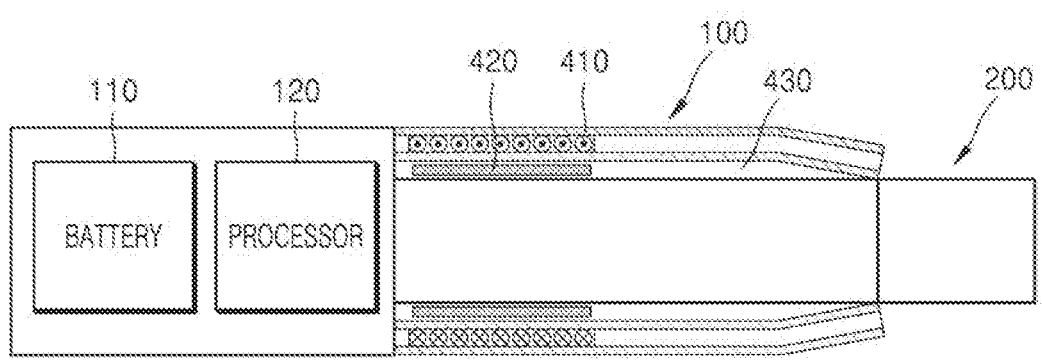
FIG. 4 is a view illustrating an example of an aerosol generating device using an induction heating method.

FIG. 4 is a view illustrating an example of an aerosol generating device using an induction heating method.

Referring to FIG. 4, the aerosol generating device 100 includes the battery 110, the processor 120, a coil 410, and a susceptor 420. Also, at least a part of the cigarette 200 may be accommodated in a cavity 430 of the aerosol generating device 100. The cigarette 200, the battery 110, and the processor 120 of FIG. 4 may respectively correspond to the cigarette 200, the battery 110, and the processor 120 of FIGS. 1 through 3. Also, the coil 410 and the susceptor 420 may be included in the heater 130. Accordingly, a repeated description will be omitted.

FIG. 4 illustrates elements of the aerosol generating device 100, which are related to the present embodiment. Accordingly, it will be understood by one of ordinary skill in the art related to the present embodiment that general-purpose elements other than the elements illustrated in FIG. 4 may be further included in the aerosol generating device 100.

The coil 410 may be located around the cavity 430. Although the coil 410 surrounds the cavity 430 in FIG. 4, the present disclosure is not limited thereto.

When the cigarette 200 is accommodated in the cavity 430 of the aerosol generating device 100, the aerosol generating device 100 may supply power to the coil 410 so that the coil 410 generates a magnetic field. When the magnetic field generated by the coil 410 passes through the susceptor 420, the susceptor 420 may be heated.

Such induction heating is a well-known phenomenon explained by Faraday's law of induction. In detail, when magnetic induction in the susceptor 420 changes, an electric field may be generated in the susceptor 420, and thus eddy current flows in the susceptor 420. The eddy current generates heat proportional to current density and conductor resistance in the susceptor 420.

When the susceptor 420 is heated by the eddy current and an aerosol generating material in the cigarette 200 is heated by the susceptor 420, an aerosol may be generated. The aerosol generated from the aerosol generating material passes through the cigarette 200 and is delivered to a user.

The battery 110 may supply power so that the coil 410 generates a magnetic field. The processor 120 may be electrically connected to the coil 410.

The coil 410 may be an electrically conductive coil that generates a magnetic field due to power supplied from the battery 110. The coil 410 may surround at least a part of the cavity 430. The magnetic field generated by the coil 410 may be applied to the susceptor 420 located on an inner end portion of the cavity 430.

The susceptor 420 is heated when the magnetic field generated from the coil 410 passes, and may include a metal or carbon. For example, the susceptor 420 may include at least one of ferrite, a ferromagnetic alloy, stainless steel, and aluminum.

Also, the susceptor 420 may include at least one of a ceramic such as graphite, molybdenum, silicon carbide, niobium, nickel alloy, metal film, or zirconia, a transition metal such as nickel (Ni) or cobalt (Co), and a metalloid such as boron (B) or phosphorus (P). However, the susceptor 420 is not limited to the above examples, and may include any material that may be heated to a desired temperature when a magnetic field is applied. The desired temperature may be pre-set in the aerosol generating device 100, or may be set as a temperature desired by the user.

When the cigarette 200 is accommodated in the cavity 430 of the aerosol generating device 100, the susceptor 420 may surround at least a part of the cigarette 200. Accordingly, the heated susceptor 420 may increase a temperature of the aerosol generating material in the cigarette 200.

Although the susceptor 420 surrounds at least a part of the cigarette in FIG. 4, the present disclosure is not limited thereto. For example, the susceptor 420 may include a tube-type heating element, a plate-type heating element, a needle-type heating element, or a rod-type heating element, and may heat the inside or the outside of the cigarette 200 according to a shape of the heating element.

Also, a plurality of susceptors 420 may be located in the aerosol generating device 100. In this case, the plurality of susceptors 420 may be located outside the cigarette 200, or may be inserted into the cigarette 200. Also, some of the plurality of susceptors 420 may be inserted into the cigarette 200, and the others may be located outside the cigarette 200. Also, a shape of the susceptor 420 is not limited to that illustrated in FIG. 4, and may include various shapes.

Figure 5:
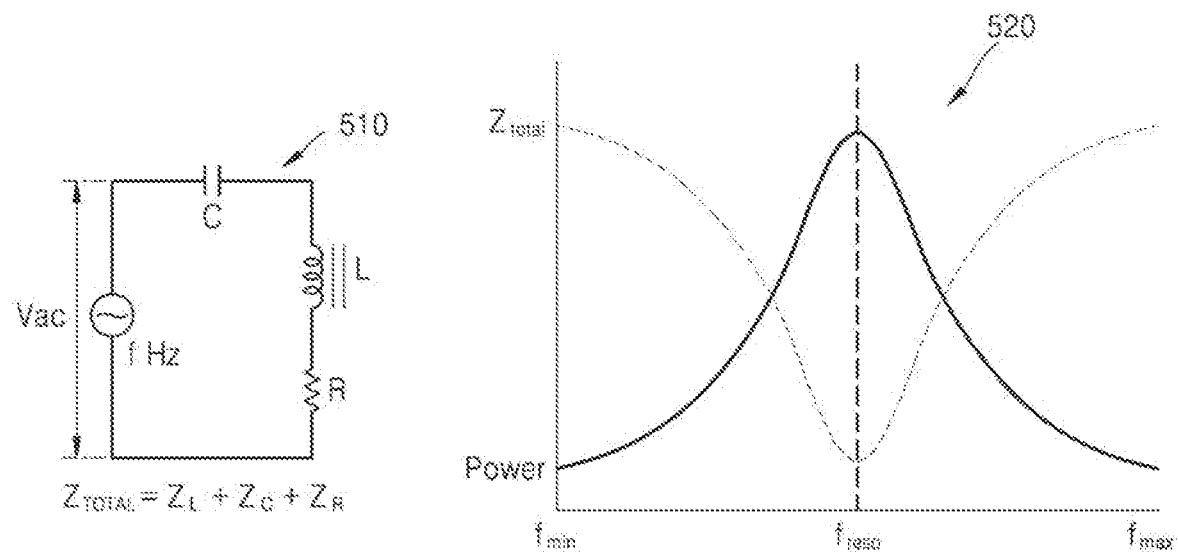
FIG. 5 is a diagram for describing an induction heating method.

FIG. 5 is a diagram for describing an induction heating method.

A coil may receive alternating current from a battery. A magnetic field is generated by the coil receiving the alternating current from the battery. When the magnetic field generated by the coil passes through a load (e.g., a susceptor), the load may be heated.

Referring to FIG. 5, the coil may be represented by an RLC circuit 510. The coil includes an inductance L, a resistance R, and a capacitance C. A total impedance $Z_{TOTAL}$ of the RLC circuit 510 is calculated as a sum of an impedance $Z_L$ of the inductance, an impedance $Z_R$ of the resistance, and an impedance $Z_C$ of the capacitance.

Each of the impedance $Z_L$ of the inductance, the impedance $Z_R$ of the resistance, and the impedance $Z_C$ of the capacitance may be expressed as in Equation 1.

$$Z_L = \omega L = 2\pi \times f \times L \qquad \text{[Equation 1]}$$

$$Z_C = \frac{-1}{\omega C} = \frac{-1}{2\pi \times f \times C}$$

$$Z_R = R$$

Resonance refers to a phenomenon where a vibrating system periodically receives an external force having the same frequency as a natural frequency, and thus an amplitude clearly increases. Resonance occurs in all vibrations including mechanical and electrical vibrations. In general, when an external force capable of vibrating a vibrating system is applied to the vibrating system and a natural frequency of the vibrating system and a frequency of the external force are the same, the vibration becomes severe and an amplitude increases.

In the same principle, when a plurality of vibrators spaced apart from one another within a certain distance vibrate at the same frequency, the plurality of vibrators resonate, and in this case, resistance between the plurality of vibrators decreases.

A resonance frequency $f_{reso}$ of the RLC circuit 510 may be determined by, for example, Equation 2.

$$f_{reso} = \frac{1}{2\pi \times \sqrt{L \times C}} \qquad \text{[Equation 2]}$$

Referring to a graph 520 of FIG. 5, when alternating current having the resonance frequency $f_{reso}$ is applied to the RLC circuit 510, maximum power may be supplied to a load (e.g., a susceptor). As a difference between a frequency of the alternating current applied to the RLC circuit 510 and the resonance frequency $f_{reso}$ increases, a value of power supplied to the load decreases.

Referring to Equation 2, the resonance frequency $f_{reso}$ of the RLC circuit 510 is determined by the inductance L of the coil and the capacitance C of a capacitor connected to the coil. In a circuit for forming a magnetic field by using the coil, the inductance L may be determined by the number of rotations or the like of the coil, and the capacitance C may be determined by a set value or the like of the capacitor connected to the coil.

Figure 6A:
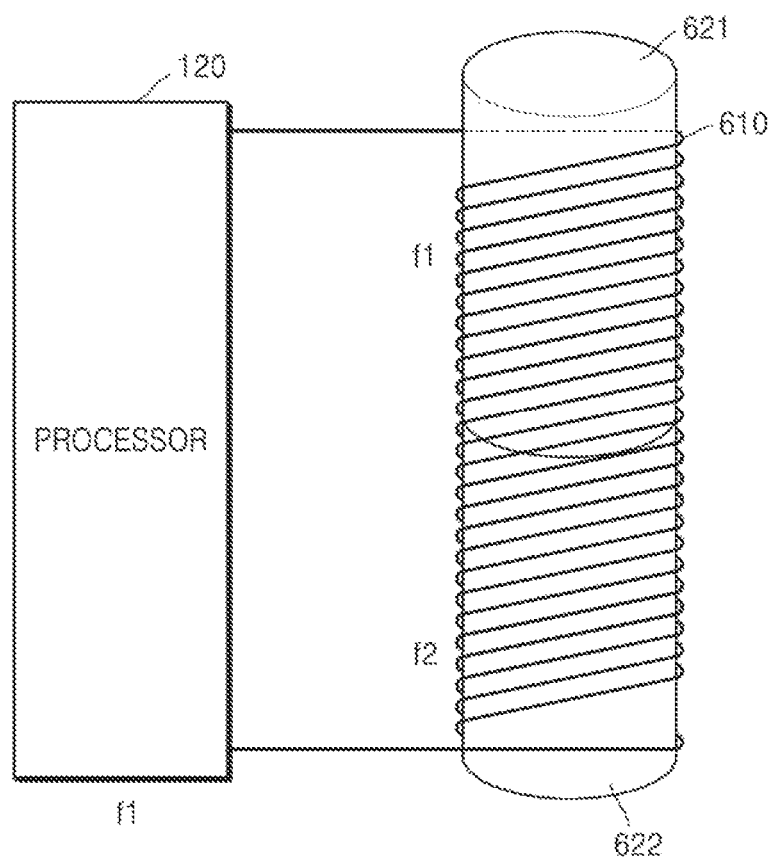
FIGS. 6A and 6B are views for describing operations of susceptors having different resonance frequencies according to frequencies.
Figure 6B:
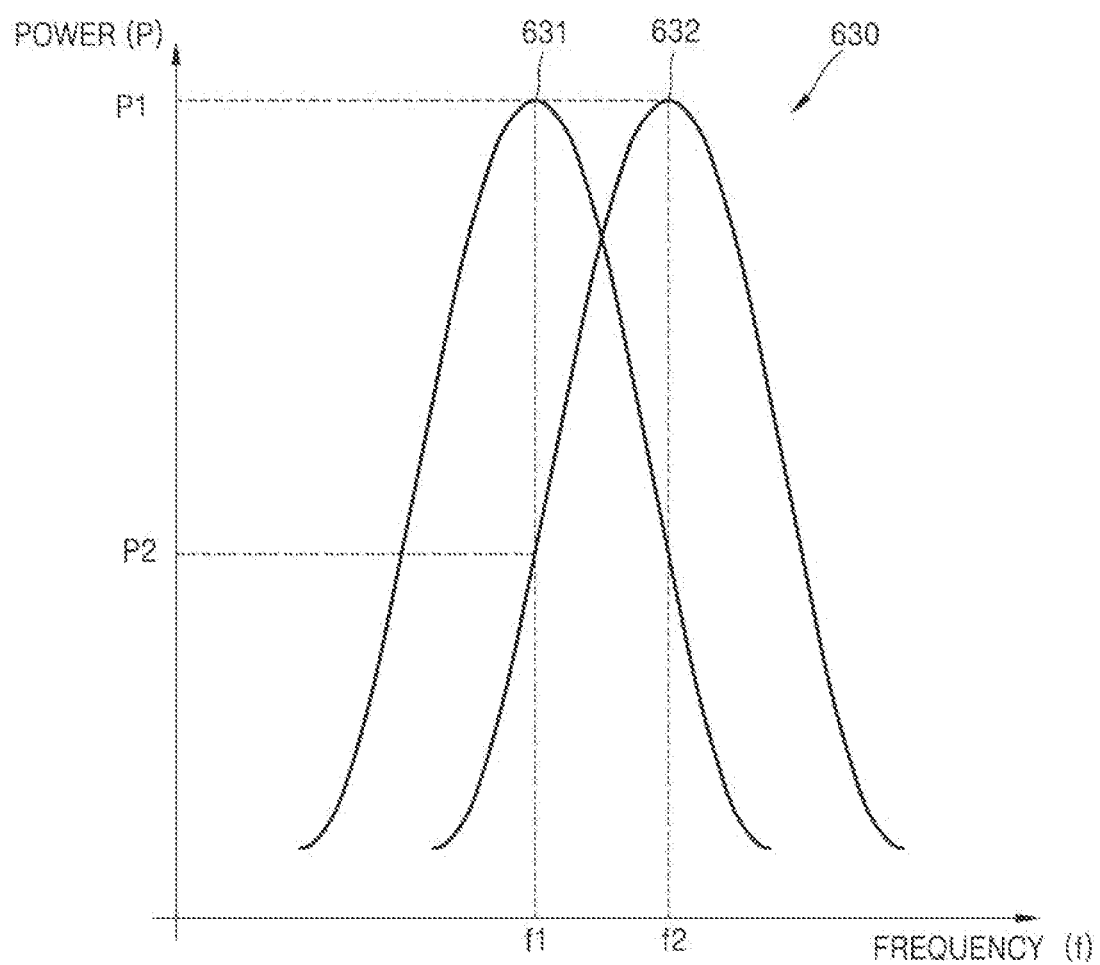

FIGS. 6A and 6B are views for describing operations of susceptors having different resonance frequencies according to frequencies.

Referring to FIG. 6A, a first susceptor 621 and a second susceptor 622 having different resonance frequencies are connected in parallel to the processor 120 (or battery).

A resonance frequency of a susceptor may be determined differently according to a type and a composition ratio of materials constituting the susceptor.

When the number of rotations, an interval, area, etc. are constant throughout the coil 610, the susceptor is also heated to a constant temperature.

When the first susceptor 621, the second susceptor 622, and the coil 610 surrounding the first susceptor 621 and the second susceptor 622 are connected in parallel to the processor 120 as shown in FIG. 6A, portions of the coil 610 respectively corresponding to the first susceptor 621 and the second susceptor 622 may receive alternating current of the same frequency from the processor 120. In this case, when resonance frequencies of the first susceptor 621 and the second susceptor 622 are different from each other, power delivered to the first susceptor 621 and the second susceptor 622 may be different.

For example, the first susceptor 621 may have a resonance frequency of f1, and the second susceptor 622 may have a resonance frequency of f2. In this case, when alternating current having the frequency of f1 is applied from the processor 120 to the coil 610, the first susceptor 621 receives maximum power from the coil 610 whereas the second susceptor 622 receives power lower than the maximum power from the coil 610.

FIG. 6B is a graph 630 showing power values for the first and second susceptors 621 and 622 having different resonance frequencies according to frequencies.

Referring to a graph 631 for the first susceptor 621, the first susceptor 621 has the resonance frequency of f1, and referring to a graph 632 for the second susceptor 622, the second susceptor 622 has the resonance frequency of f2.

When the frequency of f1 is applied to the coil 610 that heats the first susceptor 621 and the second susceptor 622, the first susceptor 621 may resonate and may receive maximum power P1. However, because the second susceptor 622 does not have the resonance frequency of f1, the second susceptor 622 may receive power P2 lower than the maximum power P1.

Figure 7:
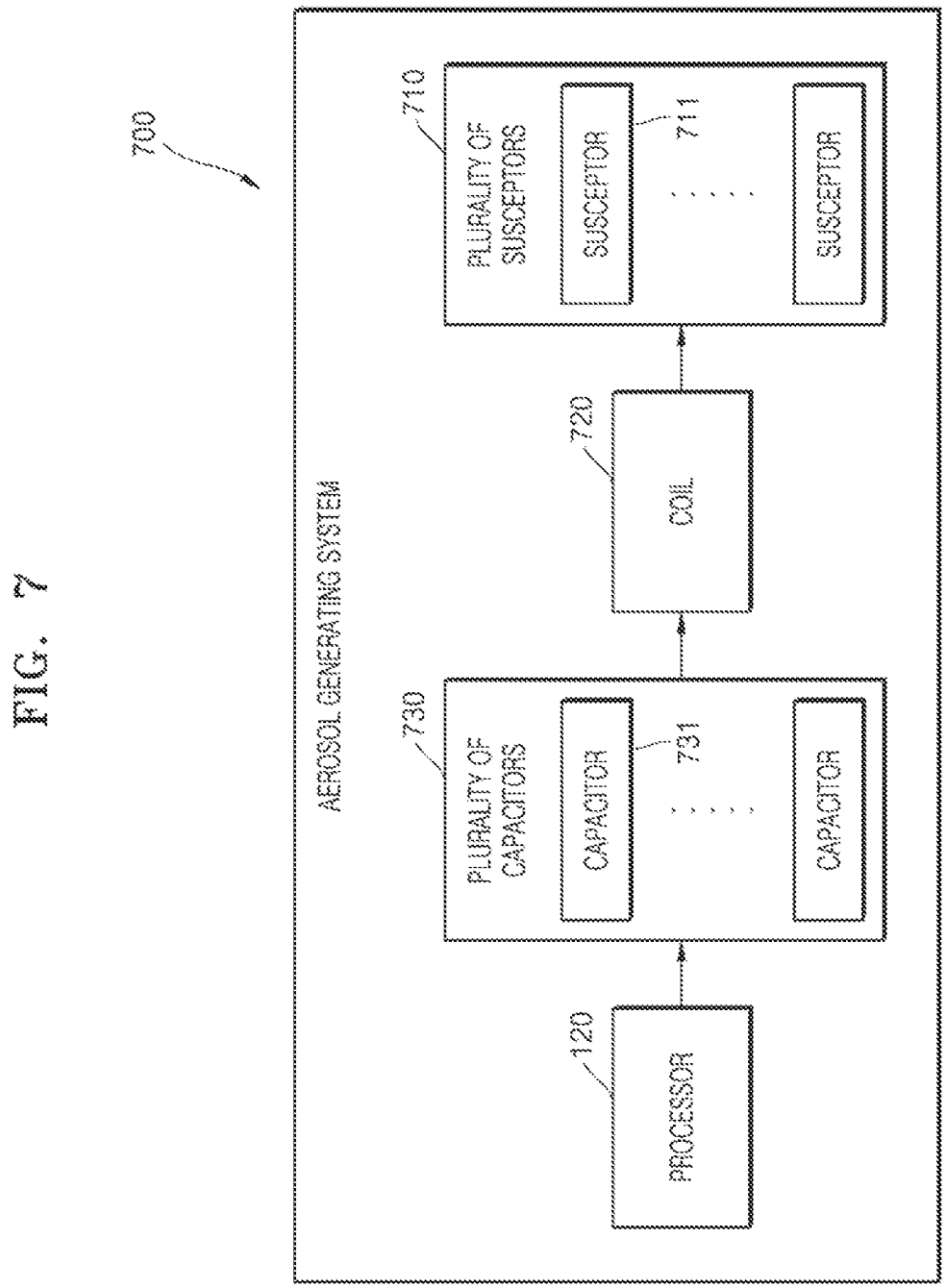
FIG. 7 is a block diagram illustrating an example of a hardware configuration of an aerosol generating system.

FIG. 7 is a block diagram illustrating an example of a hardware configuration of an aerosol generating system.

Referring to FIG. 7, an aerosol generating system 700 may include the processor 120, a plurality of susceptors 710, a coil 720, and a plurality of capacitors 730. The processor 120, the susceptors 710, and the coil 720 of FIG. 7 may correspond to the processor 120, the susceptor 420, and the coil 720 of FIGS. 1 through 4.

FIG. 7 illustrates elements of the aerosol generating system 700, which are related to the present embodiment. Accordingly, it will be understood by one of ordinary skill in the art related to the present embodiment that general-purpose elements other than the elements illustrated in FIG. 7 may be further included in the aerosol generating system 700.

The susceptors 710 may heat different portions of the cigarette 200 accommodated in the aerosol generating device 100. For example, a first susceptor may be located to correspond to a first portion of the cigarette 200 and may heat the first portion, and a second susceptor may be located to correspond to a second portion of the cigarette 200 and may heat the second portion.

The susceptors 710 may have different resonance frequencies. The susceptors 710 may include different constituent materials, or may include the same constituent materials at different ratios. For example, the first susceptor may have a resonance frequency of f1, and the second susceptor may have a resonance frequency of f2. Because resonance frequencies of the susceptors 710 are different from one another, even when current of the same frequency and the same intensity is applied to the coil 720, degrees to which the susceptors 710 are heated may be different from one another.

The coil 720 may heat the susceptors 710. As described with reference to FIG. 4, a magnetic field may be generated from the coil 720 receiving current, and the susceptors 710 may be heated due to the magnetic field.

The capacitors 730 may be connected to the coil 720. The capacitors 730 may be located in a path through which current output from the battery 110 is delivered to the coil 720 under the control of the processor 120. Current output from the battery 110 may pass through the capacitors 730, and then may be applied to the coil 720.

The processor 120 may determine a combination of capacitors 731 through which current applied to the coil 720 is to pass from among the capacitors 730. A resonance frequency of a circuit including the coil 720 and the capacitors 730 may be determined based on a capacitance determined by a combination of the capacitors 730 and an inductance of the coil 720. Accordingly, the processor 120 may determine the resonance frequency of the circuit including the coil 1720 and the capacitors 730 by determining the combination of the capacitors 731 through which current is to pass from among the capacitors 730.

The processor 120 may apply current to the coil 720 according to the determined combination. The processor 120 may apply current to the coil 720 according to the determined combination by adjusting the circuit so that current passes only through at least one capacitor 731 included in the determined combination.

The processor 120 may heat a susceptor 711 corresponding to a resonance frequency according to the determined combination from among the susceptors 710 by applying current to the coil 720 according to the determined combination. In an embodiment, the processor 120 may heat only the susceptor 711 having the resonance frequency according to the determined combination. In this case, only a portion of the cigarette 200 corresponding to the susceptor 711 may be heated. In another embodiment, the processor 120 may heat the susceptor 711 having the resonance frequency according to the determined combination, and may heat other susceptors to a lower temperature. In this case, portions of the cigarette 200 corresponding to the other susceptors may be heated to a lower temperature.

The processor 120 may apply current having the resonance frequency according to the determined combination to the coil 720. Although a resonance frequency of the circuit and a resonance frequency of the susceptor 711 are the same, when a frequency of current applied to the coil 720 is not the same, resonance does not occur and maximum power is not delivered to the susceptor 711. Accordingly, the processor 120 may adjust a frequency of current to apply current having the resonance frequency according to the determined combination to the coil 720. For example, the processor 120 may adjust a frequency of current applied to the coil 720 to a resonance frequency of the circuit by adjusting a frequency of a pulse width modulation (PWM) signal generated by performing PWM on current output from the battery 110.

Figure 8:
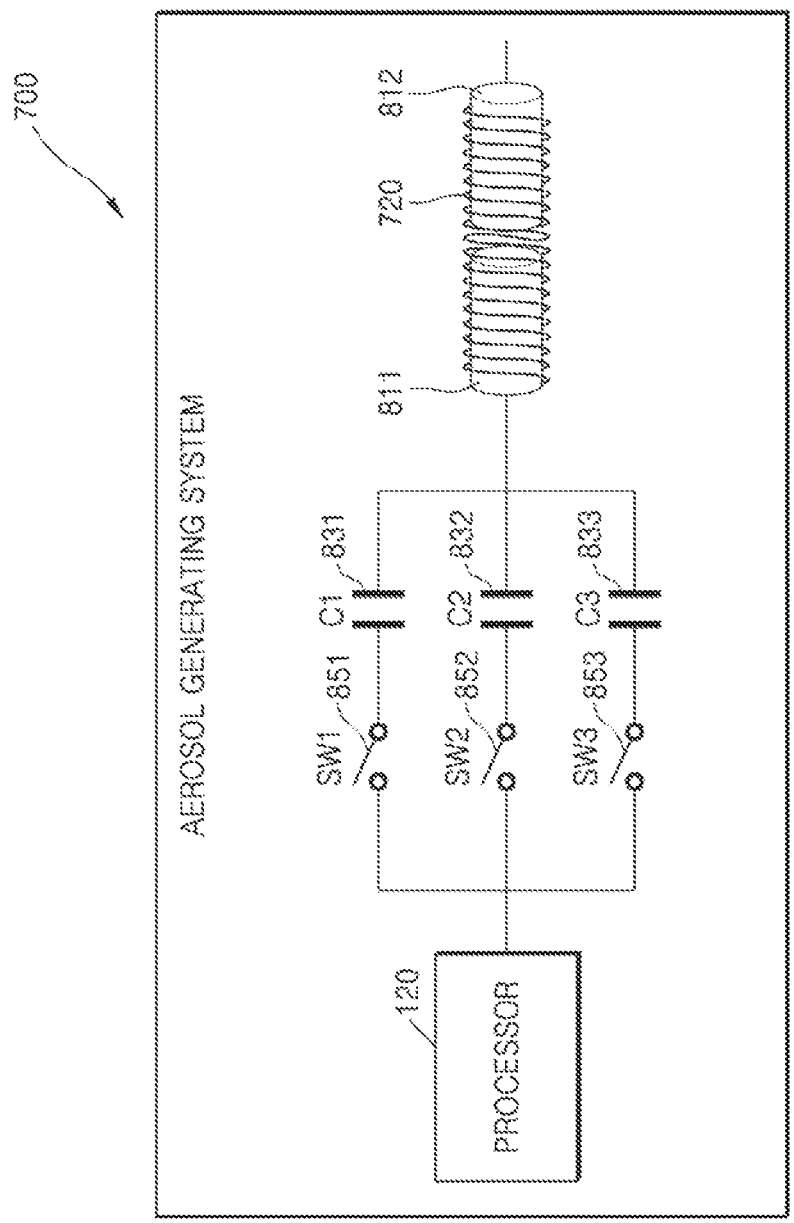
FIG. 8 is a view illustrating an example of an aerosol generating system including a circuit in which capacitors are connected in parallel to one another.

FIG. 8 is a view illustrating an example of an aerosol generating system including a circuit in which capacitors are connected in parallel to one another.

Referring to FIG. 8, the aerosol generating system 700 may include the processor 120, the coil 720, a plurality of susceptors, e.g., first and second susceptors 811 and 812, a plurality of capacitors, e.g., first through third capacitors 831, 832, and 833, and a plurality of switches, e.g., first through third switches 851, 852, and 853. The processor 120, the coil 720, the first and second susceptors 811 and 812, and the first through third capacitors 831, 832, and 833 of FIG. 8 may correspond to the processor 120, the coil 720, the plurality of susceptors 710, and the plurality of capacitors 730 of FIG. 7.

FIG. 8 illustrates elements of the aerosol generating system 700, which are related to the present embodiment. Accordingly, it will be understood by one of ordinary skill in the art related to the present embodiment that general-purpose elements other than the elements illustrated in FIG. 8 may be further included in the aerosol generating system 700.

The first through third capacitors 831, 832, and 833 may be connected in parallel to one another, and may be connected in series to the coil 720. The first through third switches 851, 852, and 853 may each be connected in series to the first and second susceptors 811 and 812. The coil 720 may surround the first and second susceptors 811 and 812.

The processor 120 may turn on/off the first through third switches 851, 852, and 853 according to a combination of capacitors through which current is to pass. When a switch is turned on, current may pass through the switch, and when a switch is turned off, current may not pass through the switch. For example, when only the first switch 851 and the second switch 852 are turned on, current may pass only through the first capacitor 831 and the second capacitor 832 and may not pass through the third capacitor 833.

When a resonance frequency of a circuit determined so that current passes only through the first capacitor 831 is the same as a resonance frequency of the first susceptor 811, the processor 120 may turn on only the first switch 851 to heat the first susceptor 811. Also, when a resonance frequency of a circuit determined so that current passes through all of the first through third capacitors 831, 832, and 833 is the same as a resonance frequency of the second susceptor 812, the processor 120 may turn on all of the first through third switches 851, 852, and 853 to heat the second susceptor 812.

For example, when a capacitance of the first capacitor 831 is set to 47 nF, a capacitance of the second capacitor 832 and the third capacitor 9833 is set to 150 nF, and an inductance of the coil 720 is set to 2 uH, the first susceptor 811 may correspond to a resonance frequency when a capacitance of the circuit is 47 nF, and the second susceptor 812 may correspond to a resonance frequency when a capacitance of the circuit is 347 nF. The processor 120 may set a capacitance of the circuit to 47 nF by turning on only the first switch 851 to heat the first susceptor 811 by supplying maximum power to the first susceptor 811. In this case, the second susceptor 812 may not be heated, or may be heated to a temperature lower than that of the first susceptor 811. Also, the processor 120 may set a capacitance of the circuit to 347 nF by turning on all of the first through third switches 851, 852, and 853 to heat the second susceptor 812 by supplying maximum power to the second susceptor 812. In this case, the first susceptor 811 may not be heated, or may be heated to a temperature lower than that of the second susceptor 812. SUS304 and SUS430 may be used as types for the susceptors 811 and 812. However, a capacitance of the first through third capacitors 831, 832, and 833, an inductance of the coil 720, and a type of a susceptor are merely examples, and the present disclosure is not limited thereto.

When a combination is determined to correspond to a resonance frequency of the first susceptor 811 and current is applied to the coil 720, in an embodiment, only the first susceptor 811 may be heated, and in another embodiment, the first susceptor 811 may be heated and the second susceptor 812 may be heated to a temperature lower than that of the first susceptor 811.

The processor 120 may heat a susceptor corresponding to a resonance frequency according to the determined combination during a pre-set time, within a time corresponding to one smoking operation. The time corresponding to one smoking operation refers to a time from when heating of the cigarette 200 starts to generate an aerosol to when the heating of the cigarette 200 ends. The pre-set time that is equal to or shorter than the time corresponding to one smoking operation may be differently set based on a type of the cigarette 200 and the susceptor.

The processor 120 may change the combination of the capacitors, after the susceptor is heated during the pre-set time. The processor 120 may heat a susceptor corresponding to a resonance frequency according to the changed combination during a remaining time. Because the resonance frequency according to the changed combination is different from the resonance frequency according to the existing combination, the susceptor heated during the remaining time is different from the susceptor heated during the pre-set time. The remaining time refers to a time after the pre-set time elapses within the time corresponding to one smoking operation.

The aerosol generating system 700 may change a heated portion of the cigarette 200 by changing a susceptor to be heated during one smoking operation. Accordingly, the aerosol generating system 700 may control current supply so that the same portion of the cigarette 2100 is not heated throughout one smoking operation, but a certain portion of the cigarette 200 is heated during a pre-set time and other portions are heated during a remaining time. The aerosol generating system 700 may prevent different feelings of smoking from being provided in the first half and the second half of one smoking operation, and may provide a uniform feeling of smoking to a user.

Figure 9:
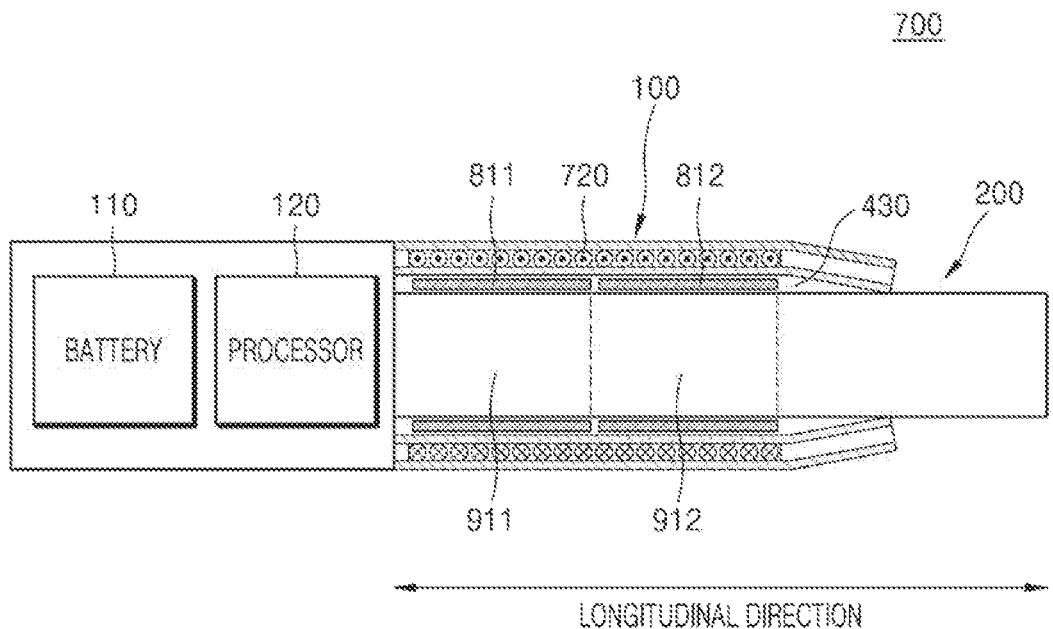
FIG. 9 is a view illustrating an example of an aerosol generating system including a cigarette.

FIG. 9 is a view illustrating an example of the aerosol generating system 700 including the cigarette 200.

Referring to FIG. 9, the aerosol generating system 700 may include the battery 110, the processor 120, the first and second susceptors 811 and 812, and the cigarette 200 accommodated in the aerosol generating device 100. The cigarette 200 may include a first portion 911 and a second portion 912. The battery 110, the cigarette 200, the processor 120, the first and second susceptors 811 and 812, and the coil 720 of FIG. 9 may correspond to the battery 110 and the cigarette 200 of FIGS. 1 through 4 and the processor 120, the plurality of susceptors 710, and the coil 720 of FIG. 7.

FIG. 9 illustrates elements of the aerosol generating system 700, which are related to the present embodiment. Accordingly, it will be understood by one of ordinary skill in the art related to the present embodiment that general-purpose elements other than the elements illustrated in FIG. 9 may be further included in the aerosol generating system 700.

The first and second susceptors 811 and 812 may be arranged in a longitudinal direction of the cigarette 200 accommodated in the aerosol generating device 100. In an embodiment, the first and second susceptors 811 and 812 may be included in the aerosol generating device 100. For example, the first and second susceptors 811 and 812 may be located in the cavity 430 in which the cigarette 200 is accommodated, and may extend in a longitudinal direction of the cavity 430. In another embodiment, the first and second susceptors 811 and 812 may be included in the cigarette 200. For example, the first and second susceptors 811 and 812 may be included in the cigarette 200 and may extend in the longitudinal direction of the cigarette 200, or may be located on an outer surface of the cigarette 200 and may extend in the longitudinal direction of the cigarette 200.

The first susceptor 811 may be located to correspond to the first portion 911 of the cigarette 200 and may heat the first portion 911 of the cigarette 200, and the second susceptor 812 may be located to correspond to the second portion 912 of the cigarette 200 and may heat the second portion 912 of the cigarette 200. The coil 720 may surround both the first and second susceptors 811 and 812 to heat both the first and second susceptors 811 and 812.

In an embodiment, the cigarette 200 may include different materials in different portions. When a susceptor corresponding to a combination of capacitors is heated, a specific portion of the cigarette 200 may be heated and an aerosol including a material constituting the specific portion may be generated. Accordingly, when different susceptors are heated, different portions of the cigarette 200 may be heated, and thus aerosols of different components may be generated. For example, assuming that the first portion 911 of the cigarette 200 includes a first flavoring material and the second portion 912 of the cigarette 200 includes a second flavoring material, an aerosol having a first flavor may be generated when the first susceptor 811 is heated, and an aerosol having a second flavor may be generated when the second susceptor 812 is heated. Also, when a heated susceptor is changed when a combination is changed during one smoking operation, a component (e.g., flavor) of an aerosol may be changed even during the one smoking operation.

In another embodiment, the cigarette 200 may include different amounts of moisturizer in different portions. When different susceptors are heated, different portions of the cigarette 200 are heated, and thus different amounts of aerosol may be generated. For example, assuming that the first portion 911 includes a relatively large amount of moisturizer and the second portion 912 includes a relatively small amount of moisturizer, when the first susceptor 811 is heated, a larger amount of aerosol may be generated than when the second susceptor 812 is heated. The aerosol generating system 700 may determine the amount of atomization of aerosol by determining a susceptor to be heated.

In another embodiment, the cigarette 200 may include different amounts of nicotine material in different portions. The aerosol generating system 700 may determine a nicotine content in an aerosol by determining a susceptor to be heated.

Figure 10:
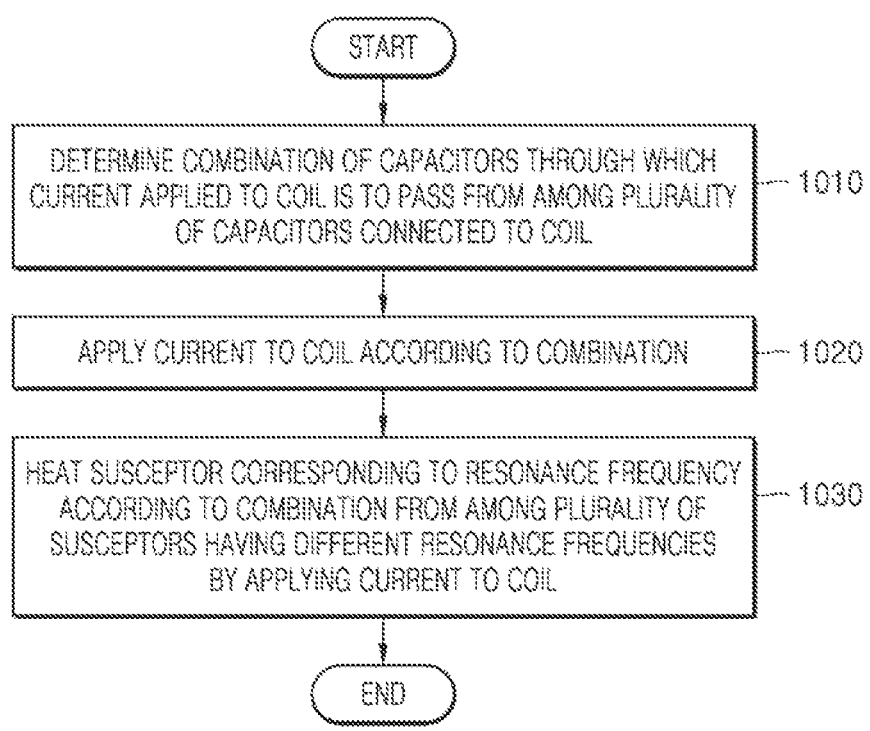
FIG. 10 is a flowchart illustrating an example of a method for operating the aerosol generating system of FIG. 7.

FIG. 10 is a flowchart illustrating an example of a method for operating the aerosol generating system of FIG. 7.

Referring to FIG. 10, the method for operating the aerosol generating system 700 includes operations that are sequentially performed by the aerosol generating system 700 of FIG. 7. Accordingly, it will be understood that, even when omitted, the same description as that made for the aerosol generating system 700 of FIGS. 7 through 9 may apply to the method for operating the aerosol generating system 700 of FIG. 10.

In operation 1010, the aerosol generating system 700 may determine a combination of the capacitors 731 through which current applied to the coil 720 is to pass from among the plurality of capacitors 730 connected to the coil 720.

The capacitors 730 may be connected in parallel to one another, and may be connected in series to the coil 720.

In operation 1020, the aerosol generating system 700 may apply current to the coil 720 according to the determined combination.

The aerosol generating system 700 may apply current having a resonance frequency according to the determined combination to the coil 720.

The aerosol generating system 700 may apply current to the coil 720 according to the determined combination by turning on/off switches respectively connected in series to the susceptors 710.

In operation 1030, the aerosol generating system 700 may heat the susceptor 711 corresponding to the resonance frequency according to the determined combination from among the plurality of susceptors 710 having different resonance frequencies by applying current to the coil 720.

The aerosol generating system 700 may heat the susceptor 711 corresponding to the resonance frequency according to the determined combination during a pre-set time, within a time corresponding to one smoking operation.

The aerosol generating system 700 may change the combination, and may heat the susceptor 711 corresponding to a resonance frequency corresponding to the changed combination during a remaining time, within the one smoking operation.

The aerosol generating system 700 may heat at least one susceptor not corresponding to the resonance frequency according to the determined combination to a temperature lower than that of the susceptor 711 corresponding to the resonance frequency according to the combination.

The susceptors 710 may be arranged in the aerosol generating device or the cigarette 200 in a longitudinal direction of the cigarette 200 accommodated in the aerosol generating device 100, and the coil 720 may surround the susceptors 710.

In an embodiment, the cigarette 200 may include different materials in different portions, and when the susceptor 711 corresponding to the determined combination is heated, aerosols of different components may be generated from the aerosol generating system 700.

In another embodiment, the cigarette 200 may include different amounts of moisturizer in different portions, and when the susceptor 711 corresponding to the determined combination is heated, different amounts of aerosol may be generated from the aerosol generating system 700.

The aforementioned embodiments of the present disclosure may be written into a program that may be executed by a computer, and may be implemented in a universal digital computer for carrying out the program using a computer-readable non-transitory recording medium. Also, a structure of data used in the embodiments may be recorded by using various units on a computer-readable recording medium. The computer-readable recording medium includes a storage medium, such as a magnetic storage medium (e.g., a read-only memory (ROM), a floppy disk, or a hard disk) or an optical medium (e.g., a compact disk (CD)-ROM or a digital versatile disk (DVD)).

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating system comprising:
   a plurality of susceptors having different resonance frequencies and configured to heat different portions of a cigarette accommodated in an aerosol generating device;
   a coil configured to heat the plurality of susceptors;
   a plurality of capacitors connected to the coil; and
   a processor configured to determine a combination of capacitors through which current applied to the coil is to pass from among the plurality of capacitors, and heat a susceptor corresponding to a resonance frequency according to the combination by applying current to the coil according to the combination.

2. The aerosol generating system of claim 1, wherein the processor is further configured to apply current having the resonance frequency according to the combination to the coil.

3. The aerosol generating system of claim 1, wherein the processor is further configured to, within one smoking operation, heat the susceptor corresponding to the resonance frequency according to the combination during a pre-set time, and then change the combination and heat a susceptor corresponding to a resonance frequency according to the changed combination during a remaining time.

4. The aerosol generating system of claim 1, wherein the processor is further configured to heat at least one susceptor not corresponding to the resonance frequency according to the combination to a temperature lower than a temperature of the susceptor corresponding to the resonance frequency according to the combination.

5. The aerosol generating system of claim 1, wherein the plurality of susceptors are arranged in the aerosol generating device or the cigarette in a longitudinal direction of the cigarette accommodated in the aerosol generating device, and the coil surrounds the plurality of susceptors.

6. The aerosol generating system of claim 1, wherein the plurality of capacitors are connected in parallel to one another, and are connected in series to the coil.

7. The aerosol generating system of claim 1, further comprising switches respectively connected in series to the plurality of susceptors,
   wherein the processor is further configured to turn on/off the switches according to the combination.

8. The aerosol generating system of claim 1, further comprising a cigarette,
   wherein the cigarette comprises different materials in the different portions,
   wherein, when the susceptor corresponding to the combination is heated, aerosols of different components are generated from the aerosol generating system.

9. The aerosol generating system of claim 1, further comprising a cigarette,
   wherein the cigarette comprises different amounts of moisturizer in the different portions,
   wherein, when the susceptor corresponding to the combination is heated, different amounts of aerosol are generated from the aerosol generating system.

10. A method for operating an aerosol generating system, the method comprising:
    determining a combination of capacitors through which current applied to a coil is to pass from among a plurality of capacitors connected to the coil;
    applying current to the coil according to the combination; and
    heating a susceptor corresponding to a resonance frequency according to the combination from among a plurality of susceptors having different resonance frequencies by applying current to the coil.

11. The method of claim 10, wherein the applying comprises applying current having the resonance frequency according to the combination to the coil.

12. The method of claim 10, wherein the heating comprises heating the susceptor during a pre-set time, within a time corresponding to one smoking operation,
    wherein the method further comprises:
    changing the combination; and,
    within the time corresponding to one smoking operation, heating a susceptor corresponding to a resonance frequency according to the changed combination during a remaining time.

13. The method of claim 10, wherein the heating comprises heating at least one susceptor not corresponding to the resonance frequency according to the combination to a temperature lower than a temperature of the susceptor corresponding to the resonance frequency according to the combination.

\* \* \* \* \*